United States Patent [19]
Jones

[11] Patent Number: 5,509,506
[45] Date of Patent: Apr. 23, 1996

[54] CASTOR BRAKE ASSEMBLY

[75] Inventor: Christopher B. Jones, Christchurch, England

[73] Assignee: The Revvo Castor Company Limited, Dorset, England

[21] Appl. No.: 382,397

[22] Filed: Feb. 1, 1995

[30] Foreign Application Priority Data

Feb. 4, 1994 [GB] United Kingdom .................... 9402136
Feb. 17, 1994 [GB] United Kingdom .................... 9403035
Oct. 26, 1994 [GB] United Kingdom .................... 9421576

[51] Int. Cl.$^6$ ................................................. B60B 33/00
[52] U.S. Cl. .......................................... 188/1.12; 16/35 R
[58] Field of Search ........................... 188/1.12, 9, 19, 188/20, 21, 31, 29, 69; 16/35 R; 280/33.994

[56] References Cited

U.S. PATENT DOCUMENTS

| | | | |
|---|---|---|---|
| 3,162,888 | 12/1964 | Mobus | 16/35 |
| 3,949,444 | 4/1976 | Mattinson | 16/35 R |
| 5,012,550 | 5/1991 | Schlosser | 16/35 R |

FOREIGN PATENT DOCUMENTS

| | | | |
|---|---|---|---|
| 0364732 | 4/1990 | European Pat. Off. | |
| 1345858 | 11/1963 | France | 188/1.12 |
| 2537505 | 6/1984 | France | |
| 9314939 | 2/1994 | Germany | |
| 156702 | 12/1980 | Japan | 188/1.12 |
| 298456 | 7/1954 | Switzerland | |

Primary Examiner—David M. Mitchell
Assistant Examiner—Peter M. Poon
Attorney, Agent, or Firm—Nixon & Vanderhye

[57] ABSTRACT

A castor assembly for a scaffold tower or similar structure needs to be provided with a brake. In this construction the brake comprises various forms of rotary cam, e.g. an eccentrically-mounted cylinder, a lobed cam and preferably formed with one or more ribs for gripping purposes. The cam may be in contact with the wheel to remove grit, etc. On movement of the wheel and wheel carrier into the braked position the cam pivots into a position where it is wedged between the swivel of the castor assembly and the wheel periphery. Thus movement of the assembly about the vertical swivel axis and rotation of the wheel about its horizontal axis is prevented.

11 Claims, 9 Drawing Sheets

CASTOR BRAKE ASSEMBLY

BACKGROUND OF THE INVENTION

1. Field of the Invention

This invention relates to a castor assembly and particularly to a castor assembly of the kind which incorporates a brake for the castor wheel.

2. Discussion of the References

Conventional castor assemblies for supporting, for example movable scaffolding towers or trolleys of various kinds may incorporate means for moving the wheel axle into either a running position, offset from the vertical swivel axis of the castor assembly, or into a locked position where, or close to where, the wheel axis intersects the vertical swivel axis to stabilize the assembly against swivelling under horizontal loads. By the application of a brake to the castor wheel in the locked position, rotation of the wheel is prevented.

SUMMARY OF THE INVENTION

One object of the present invention is to provide an improved castor assembly of the kind described.

According to the invention a castor assembly comprises a housing, a swivel enabling the housing to rotate about a vertical axis, a cam located adjacent the swivel, a wheel carrier pivotally secured to the housing by means of a horizontal pivot offset from said vertical axis, having a wheel mounted thereon so as to be rotatable about a horizontal axis and being capable of pivoting movement to cause the wheel to move into and out of a locked position wherein the cam is brakingly engaged with the wheel to prevent rotation thereof about said horizontal axis and with the swivel to prevent rotation of the housing about the vertical axis.

Preferably the carrier comprises two arms, each one extending from opposite sides of the housing so that by depression of one arm the carrier is moved about its pivot to move the wheel into the locked position and by depression of the other arm the carrier is moved about its pivot to move the wheel out of said locked position i.e. into a running position.

Preferably the movement of the wheel into said locked position causes movement of the cam into braking engagement with the periphery thereof and into braking engagement with the swivel.

Preferably, when the wheel is in the running position the cam is in contact with the wheel periphery in order to dislodge any foreign matter, such as a piece of grit which may have become attached thereto.

The cam may be rotary, loosely mounted on a horizontally disposed camshaft, and may comprise a cylinder i.e. having a circular cross-section, mounted eccentrically on the cam shaft. The cam may have other suitable cross-sectional shapes. For example the cam may be lobed in shape and be formed either by extrusion or by welding two cylinders of different diameters together, the smaller diameter cylinder providing the lobe. Further the cam may be provided with at least one formation e.g. one or more ribs and/or grooves to provide edges for gripping the wheel periphery when in braking engagement.

The shaft may be horizontally supported by attachment to two side plates of the housing or two brackets secured to a horizontal top plate of the housing.

BRIEF DESCRIPTION OF THE DRAWINGS

Three embodiments of the invention will now be described by way of example only with reference to the accompanying drawings of which.

DETAILED DISCUSSION OF PREFERRED EMBODIMENTS

The castor assembly 10 of the first embodiment illustrated in FIGS. 1–4 comprises a housing 11 having a swivel mounting 12 by which it is rotatably secured to a cylindrical steel plug 13 of suitable diameter to enter and be fixed in the lower end of, for example, a scaffolding tube forming part of a movable tower. Alternatively, socket or top plate type of mounting may be employed to suit operational requirements.

The swivel mounting 12 which is generally conventional in its construction, comprises a pair of steel discs 17 and 18, pressed to suitable profiles so as to provide races for upper and lower ball bearings 20 and 21 respectively to enable the housing 11 to be rotatably secured to the plug 13 via a suitably pressed annular portion 25 of a top plate 60 of the housing 11. An elastomeric seal 67 is provided between the top disc 17 and the top plate 60. The swivel mounting 12 is secured to the plug by means of a spigot portion 26 of the plug which is star rivetted at its lower end 27 against a washer 28.

Figure 1:
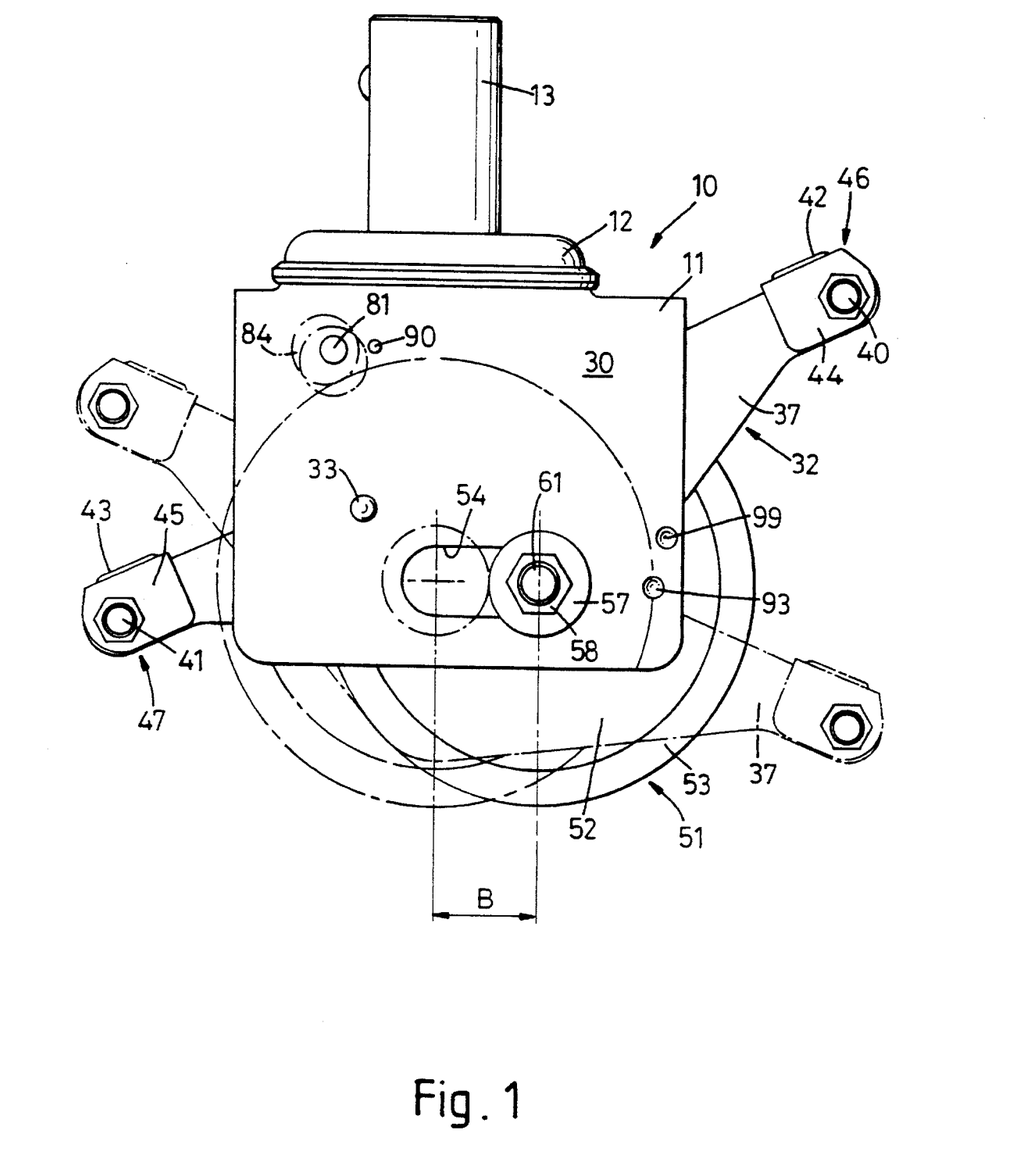
FIG. 1 shows a side view of a castor assembly according to a first embodiment of the invention.
Figure 4:
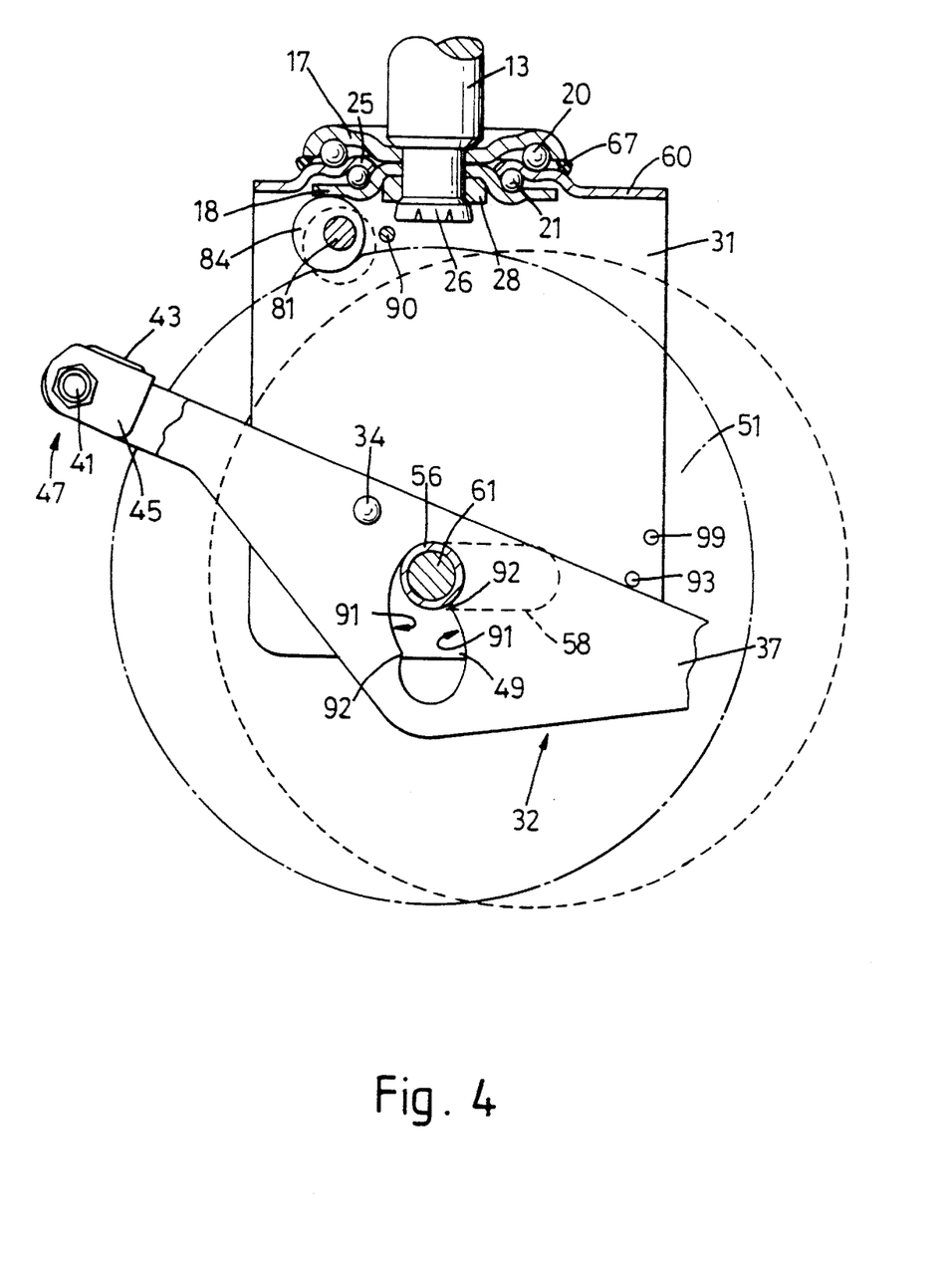
FIG. 4 shows a view similar to that in FIG. 2 but with the wheel in the braked position, and, in dotted outline, in the unbraked position, but other parts being omitted for clarity.

The housing 11 which is originally produced from a flat plate by a series of pressing operations has a top horizontal plate 60 and two downwardly extending side plates 30, 31 to which a wheel carrier 32 is secured by a means of a horizontal pivot constituted by a pair of shoulder rivets 33, 34 fastened to the side plates 30, 31 respectively. The wheel 51 is generally conventional being made of suitable material to support the loading capacity of the castor assembly. In this embodiment, the wheel has a nylon central portion 52 and a polyurethane tire 53 mechanically keyed to its circumference. The wheel is mounted on an axle bush 56, the ends of which are held in horizontal apertures 54, 55 one in each of the side plates 30, 31 by an axle bolt 61, washers 57 and nuts 58. When the axle is at one end of each horizontal aperture 54 or 55 it is directly beneath the vertical swivel axis as can be seen in FIGS. 1 and 4. When at the other end the axle is a distance B away.

Figure 5:
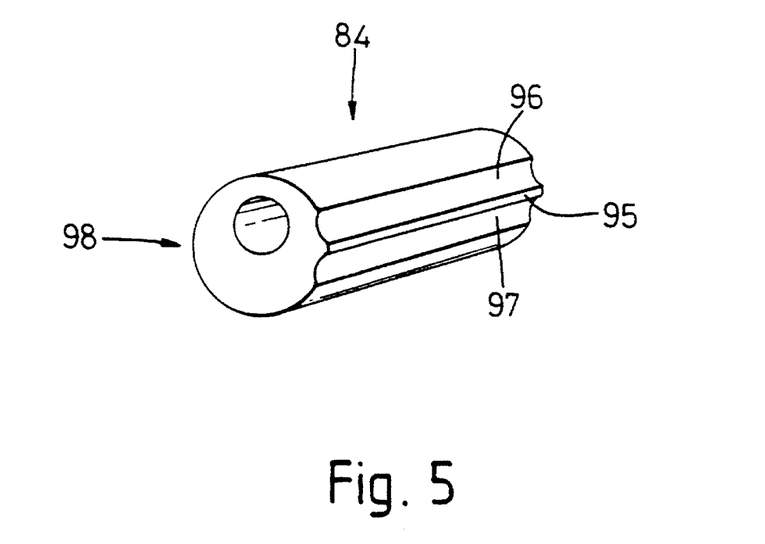
FIG. 5 shows a perspective view of an alternative form of cam for inclusion in the assembly of the first embodiment.
Figure 6:
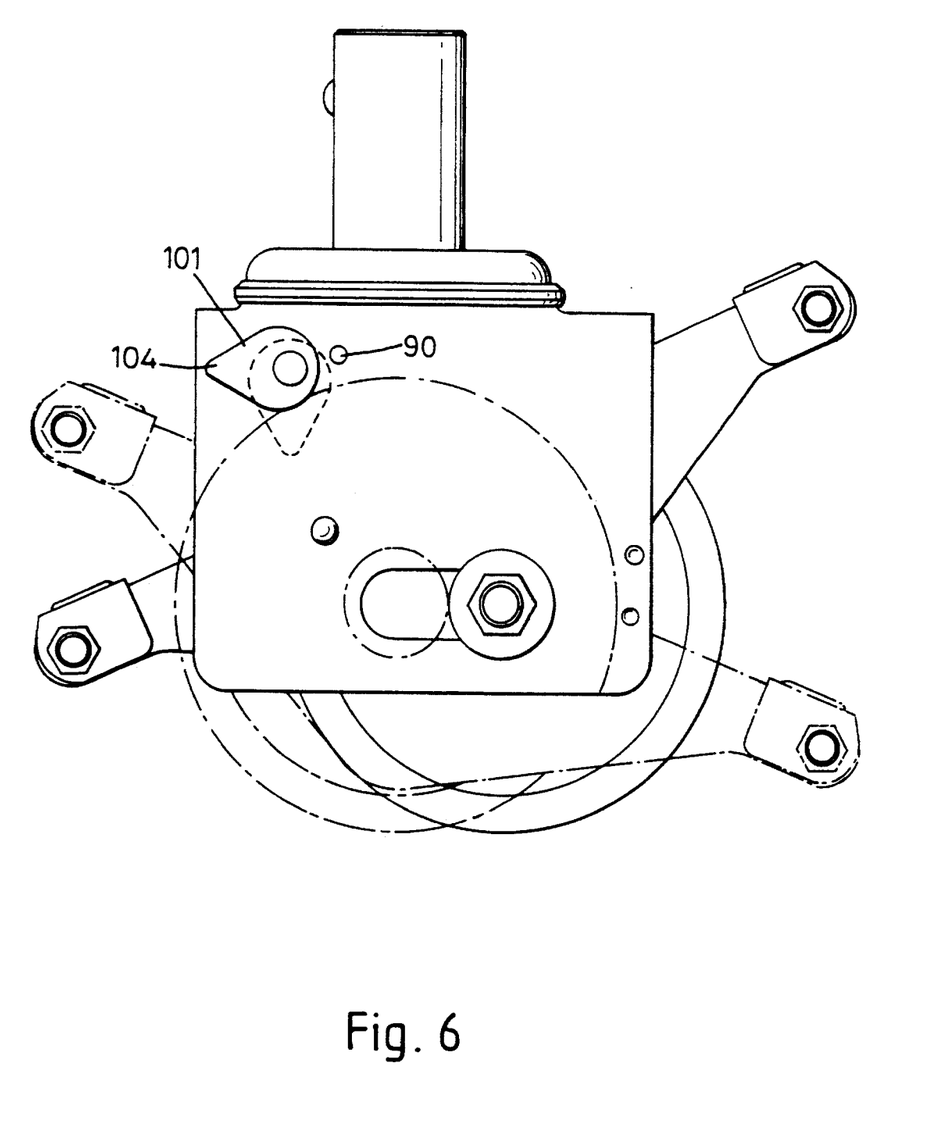
FIG. 6 shows a side view of a castor assembly according to a second embodiment of the invention.
Figure 7:
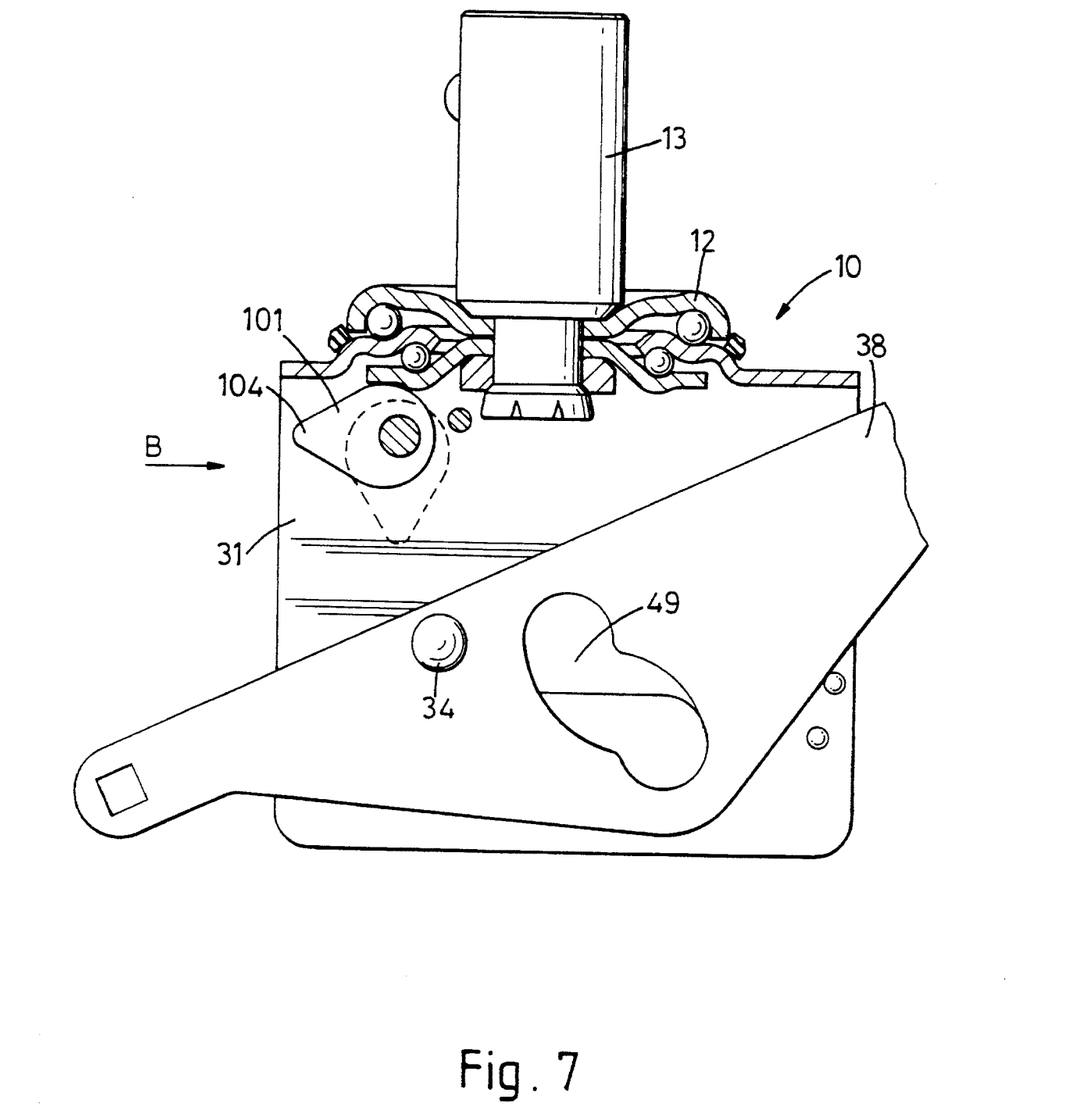
FIG. 7 shows a cross-section of the assembly of FIG. 6, the wheel being in the running position, the wheel and other parts being omitted for clarity.
Figure 8:
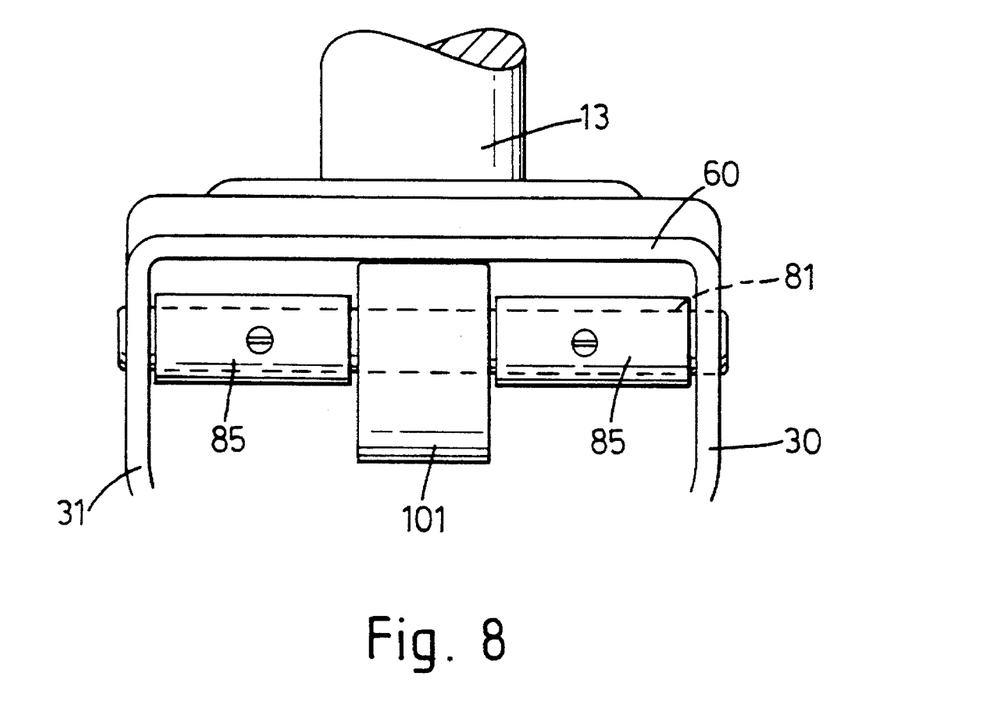
FIG. 8 shows an end view on arrow B in FIG. 7.

Adjacent to, but to one side of, the spigot portion 26 of the plug 13 within the upper portion of the housing 11 is a circular cross-section camshaft 81 secured at its ends in two holes 87, 88 one in each of the side plates 30, 31 by circlips or other suitable means. Alternatively the ends of the cam shaft 81 may be secured in holes in brackets (not shown) welded to the underside of the top plate 60. The camshaft 81 is disposed horizontally i.e. parallel to the wheel axle 56. Loosely mounted on the camshaft is a rotary cam 84 which provides a braking impediment. As shown in FIGS. 1–4 the cam is in the form of a cylinder, i.e. having a circular cross-section, eccentrically mounted on the camshaft 81. Alternatively, the cam may be cylindrical but provided with two longitudinally extending grooves 96, 97, each one parallel to the cam axis. These grooves define a ridge 95 therebetween. This cam shape is shown in FIG. 5. The cam 84 is maintained in a central position adjacent the wheel periphery on the camshaft 81 by spacer tubes 85 secured to the camshaft by circlips or grub screws 86 and each extending between one end of the cam and the nearer side plate 30 or 31. Reverse rotation of the cam is prevented by engagement with the tire on the wheel or with a retaining shaft 90 secured at its ends in two holes, one in each side plate 30, 31 (or the brackets, if the cam is mounted thereon) by circlips or other suitable means.

The two side plates 30, 31 of the housing are formed with pairs of dimples 99, 93, each projecting inwardly towards the carrier, at the positions shown in the drawings.

The wheel carrier 32 comprises a pair of generally triangular side members 37, 38 which are sheet metal pressings pivotally mounted in parallel relationship on the rivets 33, 34. This construction enables the wheel carrier to be moved about a horizontal pivot axis defined by the rivets. The ends of the side members 37, 38 are secured together respectively by welding or by nut and bolt assemblies 40, 41 (as shown) and pedal plates 42, 43 with or without side flanges 44, 45 (only two shown) to unite the side members in a rigid structure. This arrangement thus provides the carrier with a pair of arms 46, 47 each one extending on opposite sides of the housing as shown in FIG. 1. Each of the pedal plates is to provide e.g. by an embossed or indented message thereon, an indication to the operator of which of the arms needs to be pressed downwardly to release or brake the castor assembly.

Each side member 37, 38 of the carrier is formed with elongated, shaped apertures, 49 one in each side member, through which the axle bush 56 of the castor wheel 51 passes. The shaped apertures are each formed with curved sides 91 and shoulders 92 with purposes which will be described later, and the apertures have narrow portions adjacent the shoulders.

In the running position, as shown in FIG. 1, the left-hand arm 47 is in the downwards position and the right-hand arm 46 is elevated. The wheel axle is at the right hand end of the horizontal apertures 54, 55 (and thus spaced apart by a distance B from the vertical swivel axis) and in the lower end of each shaped aperture 49, being maintained there by the lower of the two shoulders 92, and by the effect of the lower dimples 93 on the side plates projecting above the top of the adjacent side member 37 or 38 of the wheel carrier.

On lowering the right-hand arm 46 to the position shown in dotted outline in FIG. 1 (and thus automatically raising the left-hand arm 47) the wheel carrier rotates about the horizontal pivot axis defined by the rivets 33, 34 the side members 37, 38 pressing against and past the dimples 99, 93 on the side plates. The wheel axle 56 is caused to move by action of the curved sides 91 of the apertures 49 to the left-hand end of the horizontal apertures 54, 55 in the housing 11 beyond the upper shoulder 92 in the aperture. The axle is retained in this position by the upper shoulder and the effect of the upper dimples 99 on the side plates projecting below the side member 37 or 38 of the wheel carrier. This camming action moves the wheel horizontally so that its axis is directly beneath the swivel axis. The periphery of the tire on the wheel moves into contact with the cam 84 to rotate it through approximately 90° about the horizontal axis of the cam shaft 81 and to bring it into contact with the lower steel disc 18 of the swivel mounting. The cam action is generated by the outer surface of the tire rotating the loosely mounted cam 84 so as to be wedged between the said tire surface and the disc 18. This brakes both the wheel and the housing with respect to the swivel. The wheel is held in this brake position by the action of the shoulder 92 on the shaped apertures 49 and the braked is only released by depression of the pedal 43 on the arm 47. Reverse rotation of the cam is restricted by the shaft 90.

Figure 2:
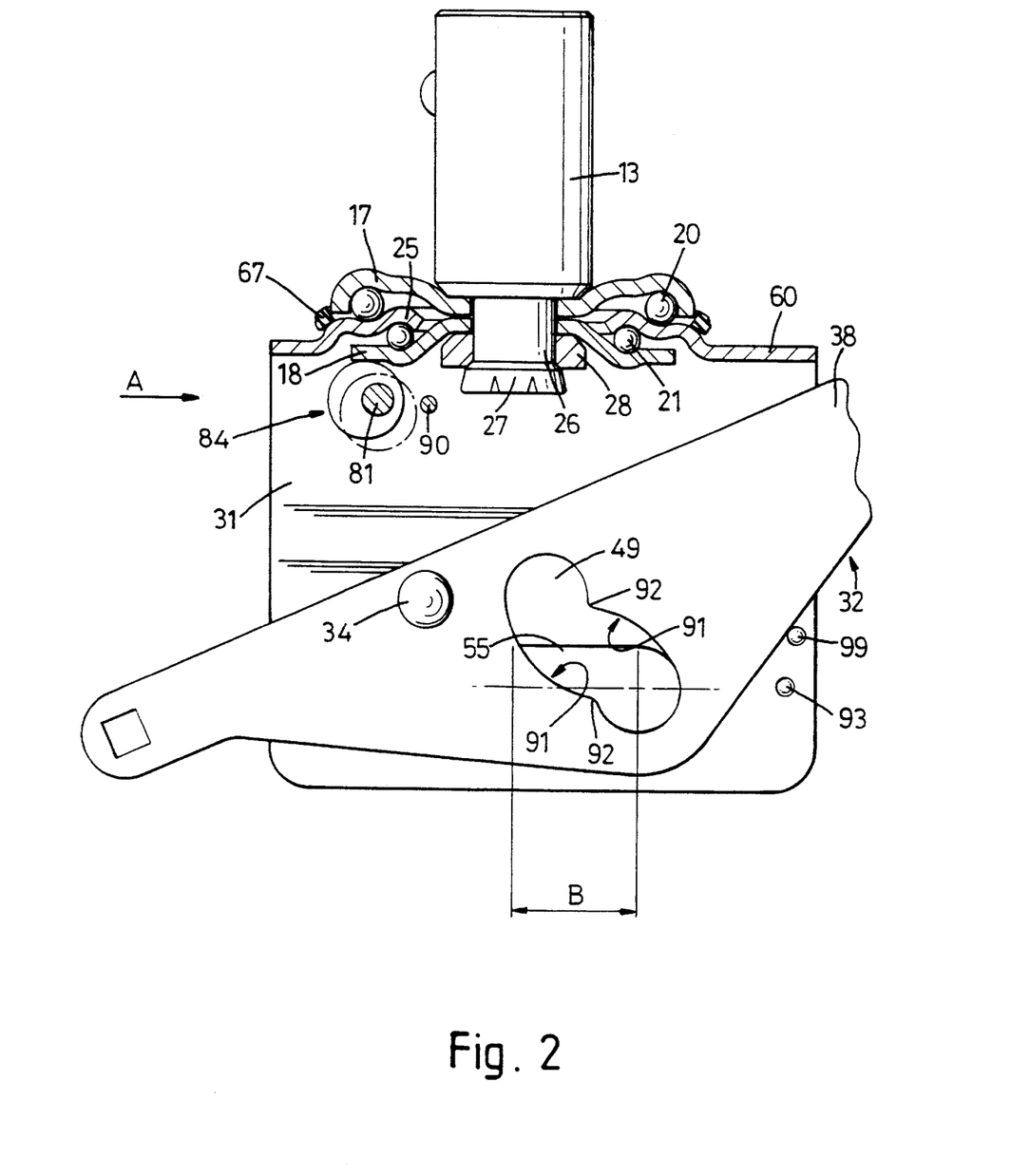
FIG. 2 shows a cross-section of the assembly of FIG. 1, the wheel being in the running position, the wheel and other parts being omitted for clarity.

If the cam is as shown in FIG. 5, the two grooves 96, 97 and the ridge 95 face to the right as shown in FIGS. 1 and 2 when the castor wheel 51 is in the running position. When the wheel is moved to the locked position, as shown in FIG. 4, the cam rotates through about 90° so that the ridge 95 presses against the peripheral surface of the tire 53, and the curved surface 98 opposite the ridge 95, presses against the lower surface of the plate 18, thus braking the wheel and housing with respect to the swivel.

Figure 9:
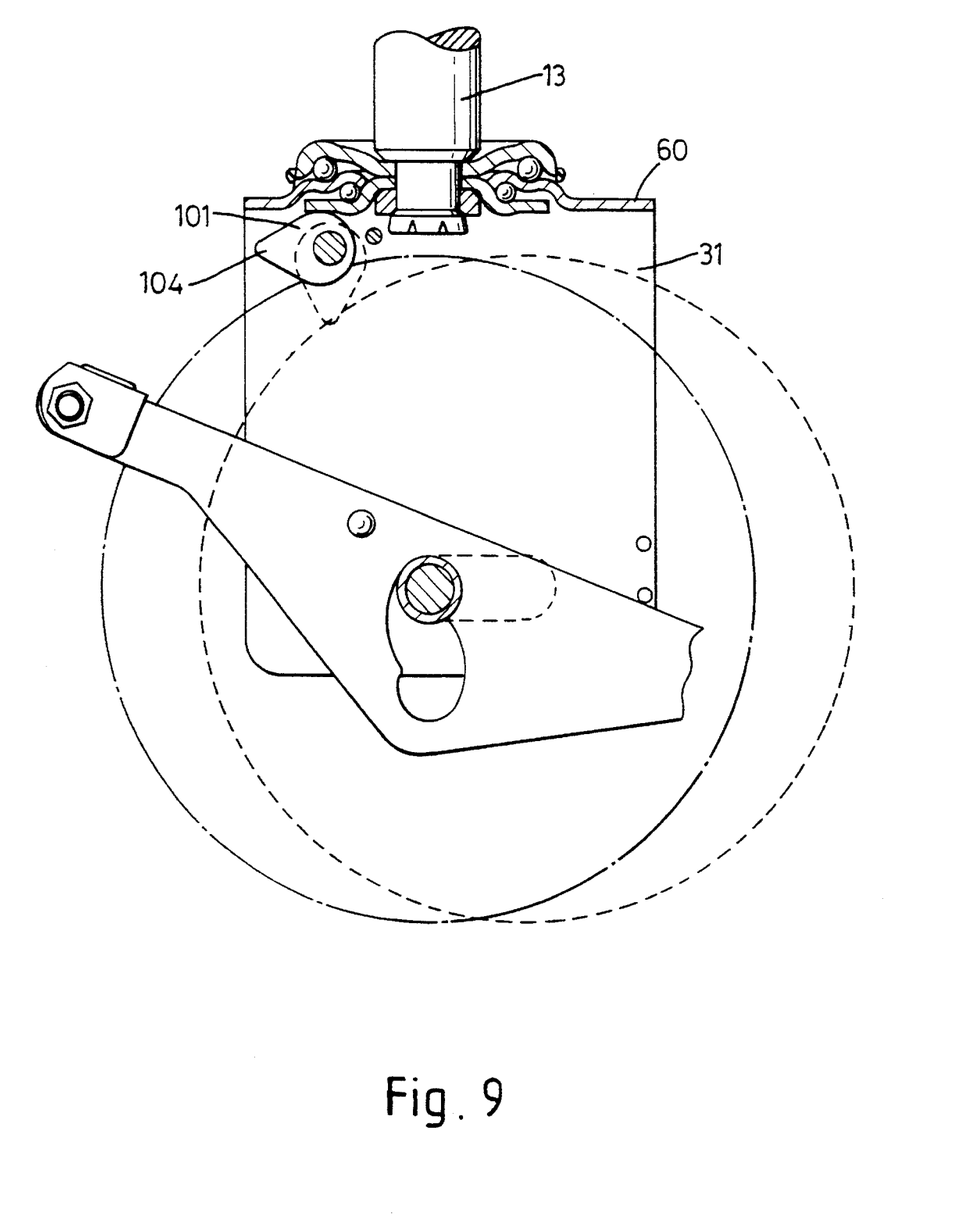
FIG. 9 shows a view similar to that of FIG. 7 but with the wheel in the braked position, and, in dotted outline, on the unbraked position with the cam in contact therewith, other parts being omitted for clarity.

The castor assembly of the second embodiment illustrated in FIGS. 6–9 is similar to that of the first embodiment and the same reference numerals for like features. However in the second embodiment the cam 101 has a lobed shape generally having a tear-drop or pear-drop cross-section. The lobed portion 104, i.e. having the smaller radius of curvature, hangs downward, directly beneath the cam shaft 81, when the castor wheel 51 is in the running position. The lobed portion 104 is in contact with the outer periphery of the tire 53 (as illustrated in FIG. 9) so as to dislodge any foreign matter, such as a piece of grit, which may become attached thereto. When the wheel 51 is moved to the locked position, as shown on FIG. 9, the cam is rotated through about 90° so as to take up the position shown, the lobed portion 104 being directed to the left. The cam thus becomes wedged between the peripheral surface of the tire 53 and the lower surface of the plate 18, thus braking the wheel and the housing with respect to the swivel. Reverse rotation of the cam 101 may be restricted by the lobe 104 touching the wheel surface or by the cam touching the pin 90.

Figure 10:
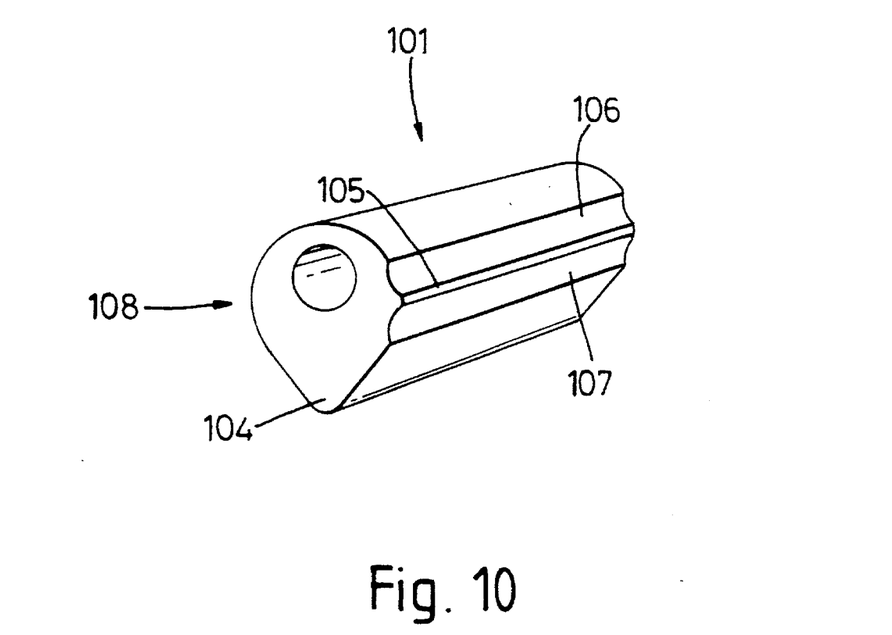
FIG. 10 shows a perspective view of an alternative form of cam for inclusion in the assembly of the second embodiment.

As shown in FIG. 10, the lobed cam 101 may alternatively be provided with two parallel, longitudinally extending grooves 106, 107 defining a ridge 105, therebetween. When the wheel is moved to the locked position the lobe of this cam would be directed to the left (if included in FIGS. 6, 7 and 9), the ridge 105 would press against the tire peripheral surface and the curved surface 108 opposite the ridge 105 would press against the under surface of the plate 18, thus braking the wheel and housing with respect to the swivel.

Figure 11:
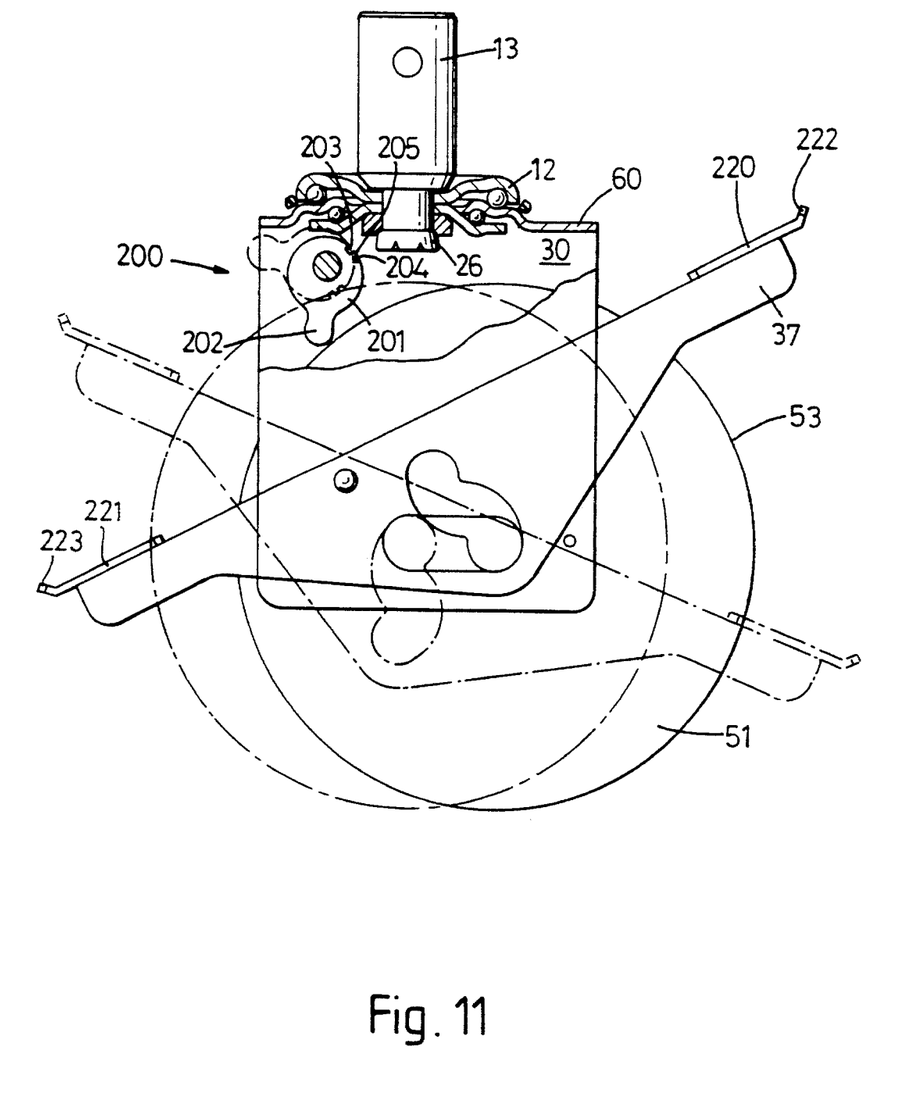
FIG. 11 shows a partial side view, partial cross-sectional view of a castor assembly according to a third embodiment of the invention.

The castor assembly of the third embodiment shown in FIG. 11 is similar to the assembly of the second embodiment. In this embodiment to lobed cam 200 comprises two cylindrical rods, one 201 having a larger diameter than the other 202, welded together to have the cross-sectional shape as shown. The larger of the two rods is formed by a machining process with two grooves 203,204 extending parallel to the rod axis and defining a rib 205 therebetween. These formations of grooves and ribs are positioned on the outer surface of the cam 200 to contact the periphery of the tire 53 on the wheel 51 when the wheel and carrier are in the braked position as shown in dotted outline in FIG. 11. These formations provide gripping edges which enhance the braking action. Alternatively this shape of cam may be formed by an extrusion process, or from stamped laminations fastened together.

Figure 3:
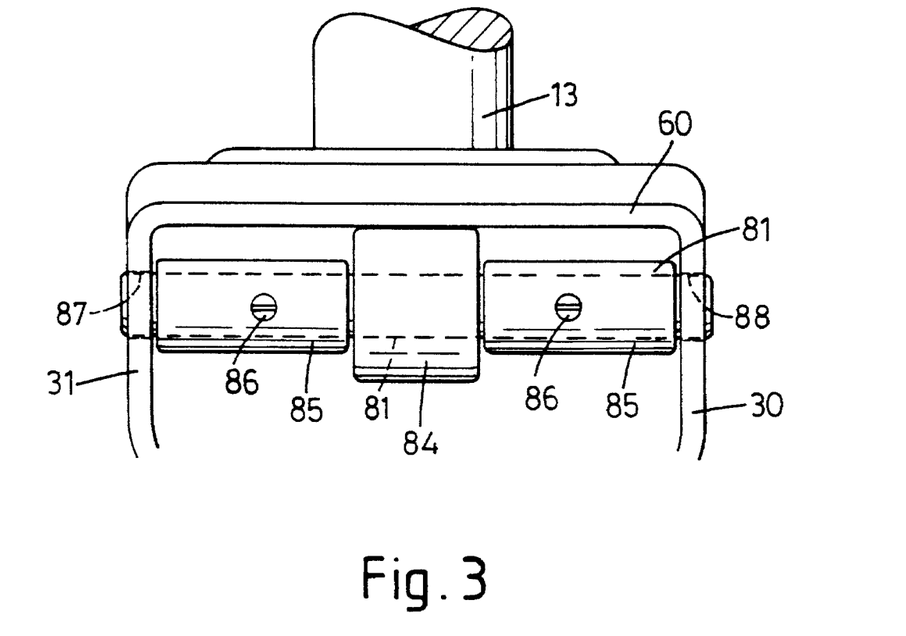
FIG. 3 shows an end view in direction of arrow A in of FIG. 2.

The cam 200 is also positioned relative to the wheel 51 so that it is not possible for reverse rotation to occur i.e. to the right (as shown in FIG. 11) whereby the lobe 202 is positioned beneath the spigot portion 26, thus avoiding the need for a retaining shaft 90 as shown in FIG. 3.

In this embodiment the pedal plates comprise flat plates 220,221, with upturned edges 222,223, welded to the ends of the arms 37,38.

The castor assembly in accordance with the invention is robust, simple and easily operated. The wheel carrier may be moved from a running position to a locked position or vice versa by an operator applying downwards foot pressure to the pedal plate on appropriate arm 37, 38 of the wheel carrier.

What I claim is:

1. A castor assembly comprising:

a housing;

a swivel enabling the housing to rotate about a vertical axis;

a cam located adjacent the swivel and constrained to rotate about a horizontal axis; and a wheel carrier pivotally secured to the housing by means of a horizontal pivot offset from said vertical axis, the wheel carrier having a wheel mounted thereon so as to be rotatable about a horizontal axis and being capable of pivoting movement to cause the wheel to move into and out of a locked position wherein in said locked position the cam is brakingly engaged with a periphery of the wheel to prevent a rotation thereof about said horizontal axis and with the swivel to prevent rotation of the housing about the vertical axis, wherein said cam, said swivel, said wheel and said wheel carrier comprise a means for rotationally wedging said cam between said swivel and said wheel periphery during movement of said wheel carrier into said locked position.

2. A castor assembly according to claim 1 wherein the carrier comprises two arms, each one extending from opposite sides of the housing so that by depression of one arm the carrier is moved about its pivot to move the wheel into the locked position and by depression of the other arm the carrier is moved about its pivot to move the wheel out of said locked position.

3. A castor assembly according to claim 1 wherein the movement of the wheel into said locked position causes movement of the cam into braking engagement with the wheel periphery and into braking engagement with the swivel.

4. A castor assembly according to claim 1 wherein when the wheel moves out of said locked position, the cam is in contact with the wheel periphery.

5. A castor assembly according to claim 1 wherein the cam is loosely rotatably mounted on a camshaft.

6. A castor assembly according to claim 5 wherein the camshaft is horizontally disposed.

7. A castor assembly according to claim 6 wherein the camshaft is horizontally supported by attachment to two side plates of the housing.

8. A castor assembly according to claim 6 wherein the camshaft is supported horizontally by attachment to two brackets secured to the housing.

9. A castor assembly according to claim 5 wherein the cam comprises a cylinder mounted eccentrically on the camshaft.

10. A castor assembly according to claim 1 wherein the cam is lobed in shape.

11. A castor assembly according to claim 1 wherein the cam is provided with at least one formation for gripping the wheel periphery when in braking engagement therewith.

* * * * *